United States Patent [19]

Nield et al.

[11] Patent Number: 5,258,471
[45] Date of Patent: * Nov. 2, 1993

[54] CURABLE COMPOSITION COMPRISING A CRYSTALLISABLE POLYMER

[75] Inventors: Eric Nield, Beaconsfield; Riaz A. Choudhery, Slough, both of England

[73] Assignee: Imperial Chemical Industries PLC, London, England

[*] Notice: The portion of the term of this patent subsequent to Sep. 7, 2010 has been disclaimed.

[21] Appl. No.: 709,579

[22] Filed: Jun. 5, 1991

[30] Foreign Application Priority Data

Jun. 19, 1990 [GB] United Kingdom ............... 9013678

[51] Int. Cl.$^5$ ............................................ C08F 20/00
[52] U.S. Cl. .................................... 525/438; 525/449; 525/461; 525/463
[58] Field of Search ................ 525/438, 449, 461, 463

[56] References Cited

U.S. PATENT DOCUMENTS

| | | | |
|---|---|---|---|
| 3,607,375 | 9/1971 | Wlejak | 117/138.8 AU |
| 3,766,109 | 10/1973 | Pratt et al. | 260/23 |
| 4,059,557 | 11/1977 | Bentley et al. | 523/522 |
| 4,419,465 | 12/1983 | Backhouse et al. | 523/201 |
| 4,427,820 | 1/1984 | Backhouse et al. | 525/66 |
| 4,525,499 | 6/1985 | Hayashi et al. | 523/523 |
| 4,739,019 | 4/1988 | Schappert et al. | 525/438 |
| 4,952,456 | 8/1990 | Metcalfe et al. | 525/119 |
| 4,997,864 | 3/1991 | Waters | 523/319 |
| 5,084,525 | 1/1992 | Akutagawa et al. | 525/423 |

FOREIGN PATENT DOCUMENTS 465001 8/1992 European Pat. Off. .
1461858 12/1966 France .

OTHER PUBLICATIONS 82-80909E, Derwent Publications Ltd.; Powdered polymer filler for paints.
Chemical Abstracts, vol. 112, No. 14, Apr. 2, 1990, p. 95, Abstract No. 120678e.

Primary Examiner—John C. Bleutge
Assistant Examiner—Randy Gulakowski
Attorney, Agent, or Firm—Cushman, Darby & Cushman

[57] ABSTRACT

A composition comprising a polymer in dispersion in a non-aqueous continuous diluent, in which the polymer phase comprises a crystallisable polymer, selected from polyesters, polycarbonates and polyamides, a curable solvent for the crystallisable polymer which is miscible with the continuous diluent, and optionally, an auxiliary solvent, and in which the curable solvent is at least partially reacted with the crystallisable polymer, so as to form a stabiliser for the dispersion.

9 Claims, No Drawings

CURABLE COMPOSITION COMPRISING A CRYSTALLISABLE POLYMER

This invention relates to a curable composition which comprises a crystallisable polymer in dispersion in an inert liquid and a curable material which is miscible with the inert liquid and which is at least partially reacted with the polymer so as to stabilise the dispersion. It also relates to a process for making the composition and to a modification of the process so as to obtain free flowing powders of polymer particles which comprise a crystallisable polymer. The invention also relates to a process for forming a cured coating which contains a crystallisable polymer using the composition or the powder and to a substrate when coated by the process.

Crystallisable polymers are well known. They include polyesters such as polyethylene terephthalate (PET) polybutylene terephthalate (PBT) (these usually have a density of about 1.4 and 1.3 g/cm$^3$ respectively), or copolymers of ethylene glycol and a mixture of terephthalic and isophthalic acids (PET/I), polycarbonates, and polyamides (often called nylons).

A fuller description of the various types of polyester, polycarbonate or nylon is given in the third edition of Kirk-Othmer's "Encyclopaedia of Chemical Technology" published by John Wiley & Sons of New York in 1982, see Volume 18 pages 549 to 574 pages 479 to 494 or pages 406 to 425 for polyesters, polycarbonates and nylons respectively. The pages are herein incorporated by reference.

Examples of useful polyester copolymers include polyethylene terephthalate, copolymers comprising both terephthalic and isophthalic acid and elastomeric polyesters having segments of a low glass transition temperature, such as polyester-polyether block copolymers some of which are commercially available from E I DuPont de Nemours under the Trade Mark Hytrel.

Examples of useful polyamides are nylon 6,6, nylon 6 and copolymers of these.

Polyamides also include recently available nylon 4, 6 and so called partially crystalline aromatic nylons. Aromatic nylons are polyamides comprising condensates of aromatic diamines such as 1,3-di(aminomethyl) benzene.

Examples of useful polycarbonates are 2,2-bis (4 hydroxyphenol) propane (Bisphenol A) polycarbonate commercially available from Anic Spa of Italy under the Trade Mark Sinvet.

Some of the above crystallisable polymers can acquire a partially crystalline form merely by solidifying from the molten state whilst some (notably the polycarbonates and some polyesters) are amorphous as supplied but may be easily converted to partially crystalline form by exposure to solvents. It is for this reason that the polymers are herein described generically as "crystallisable" rather than "crystalline".

In general, crystallisable thermoplastic polymers have many properties such as toughness, hardness, abrasion resistance and flexibility which make them potentially useful as coating materials.

However, most attempts to incorporate crystallisable thermoplastic polymers into cured coatings have involved physically grinding the polymer so as to form a polymer powder which is then mixed into a liquid coating composition. These attempts have led to highly inhomogenous structures which because of their inhomogeneity have shown only minimal improvements in the overall properties of the cured coating.

U.S. Pat. No. 3,766,109 discloses a process for making powders for direct use as powder coatings which comprises grinding up a solid mixture of an addition polymer, an epoxy resin and an anhydride.

One composition which comprises a crystalline polyester mixed with a non-crystalline polyester, and a water soluble organic compound in dispersion in water is described in U.S. Pat. No. 4340519. However, this composition suffers from the disadvantage that the aqueous continuous phase can cause hydrolysis and hence degradation of the dispersed polyester resin.

Additionally, these aqueous compositions are made by an emulsion process and therefore are limited to those polymer mixtures which will form liquid solutions at temperatures below 100° C. if the mixture is to be emulsified at standard pressures.

A coating composition comprising a crystallisable polymer having improved homogeneity is described in unpublished copending European Patent Application number 89313522.8. This Application describes a non-attritive process for producing particles of a crystallisable polymer which contain an entrapped crosslinkable solvent for the polymer. One process which is described therein comprises dissolving the crystallisable polymer in a moderate solvent at a temperature above the crystalline melt temperature of the polymer when in the solvent and then allowing the solution to cool so as to cause solid/liquid phase separation of solid polymer.

The result of this process is a dispersion in the solvent of particles of crystallisable polymer which contain imbibed solvent. The process may be carried out using a crosslinkable solvent. Alternatively, a non-crosslinkable solvent may be used which is afterwards exchanged for a crosslinkable solvent. In either case, the end result is particles of crystallisable polymer which contain an entrapped crosslinkable solvent. These particles allow the subsequent production of cured coatings containing a more uniform distribution of crystallisable polymer with consequent improvement in properties.

It is an object of the present invention to provide an alternative composition which comprises a crystallisable polymer in dispersion in a diluent which composition also comprises a curable material and which does not require an added stabiliser.

According to the present invention there is provided a composition comprising a polymer phase in dispersion in a non-aqueous continuous diluent, in which the polymer phase comprises a crystallisable polymer selected from polyesters, polyamides and polycarbonates, a curable solvent for the crystallisable polymer which is miscible with the continuous diluent and, optionally an auxilliary solvent, and in which the cureable solvent is at least partially reacted with the crystallisable polymer so as to form a stabiliser for the dispersion.

It has been found that the use of a curable solvent which is miscible with the diluent and which is at least partially reacted with the crystallisable polymer enables dispersions of crystallisable polymer to be made which also comprises a curable material without the use of an added stabiliser of any kind.

Preferably at ambient temperatures the composition comprise solid particles of the polymer phase dispersed in the diluent. The solid particles are held in stable dispersion by the presence of the portion of curable solvent which has been reacted with the polymer. The curable solvent which is reacted, being miscible with the diluent acts as a stabiliser for the dispersion. The particles also comprise some of the unreacted curable solvent, while some of the unreacted curable solvent is in solution in the continuous diluent.

Solid means having a tack temperature of greater than 60° C. Tack temperature is measured by isolating some of the polymer phase, for example by filtering and washing, and applying a sample of this onto a surface having a known graduated temperature such as a Kohfler bar. After 1 min., an attempt is then made to brush off the residue using a small soft paint-brush. The temperature above which the residue is not removable in this way is called the Tack Temperature.

The size of the particles of the polymer phase is generally between $0.1\mu$ and $500\mu$, preferably between $0.1\mu$ and $50\mu$ more preferably between $0.5\mu$ and $20\mu$ and most preferably between 0.5 and $5\mu$.

Preferably, the weight ratio of the curable solvent to the crystallisable polymer in the composition is from 5:85 to 85:15, more preferably 20:80 to 80:20, still more preferably 20:80 to 50:50 and most preferably 20:80 to 40:60.

Preferably, the weight of the polymer phase which is the combined weight of the crystallisable polymer, the curable solvent and any auxiliary solvent is at least 5% of the weight of the composition, more preferably from 15 to 80% of the weight of the composition and most preferably from 15 to 60% of the weight of the composition.

The crystallisable polymer can comprise a single crystallisable polymer or a blend of two or more crystallisable polymers.

Preferably the crystallisable polymer is a polyester.

The curable solvent is a material which is capable of undergoing curing, which in its uncured state can form a homogeneous solution together with the crystallisable polymer and any auxiliary solvent present, which can react with the crystallisable polymer, and which is miscible with the diluent.

Preferably the curable solvent is chosen such that phase separation of crystallisable polymer can occur on curing the solvent. This has the advantage that a crosslinked coating formed from the composition can comprise a continuous cured material derived from the curable solvent, in which are distributed discrete zones, preferably contiguous zones, of crystallisable polymer.

The phase separation of the crystallisable polymer can be seen using a scanning electron microscope (SEM). The contrast between different polymer phases can be enhanced in order to easily see the separation using the SEM. This enhancement can be achieved by selectively etching or staining one of the phases as described in "Polymer Microscopy" by L C Sawyer and D T Grubb (Chapman and Hall Ltd 1987).

When the curable solvent undergoes curing it takes part in a crosslinking reaction so as to form a high molecular weight crosslinked polymeric material. The curable solvent can be self-curable, that is a material which can cure by undergoing a crosslinking reaction with itself. Alternatively, the cureable solvent can crosslink by further reaction with the crystallisable polymer. A further alternative is that the curable solvent can be a material which can undergo a crosslinking reaction with a suitable crosslinking agent. Certain curable solvents can be cured by more than one of these routes.

When the curable solvent is self-curable it can, for example, be of the type which crosslinks in the presence of oxygen, for example, an unsaturated alkyd resin. Another example of a self-curable solvent is an epoxy functional resin which can be made to crosslink with itself in the presence of an acid catalyst.

Preferably, the curable solvent is a material which reacts with a crosslinking agent. The composition then also comprises a suitable crosslinking agent. Preferably, the crosslinking agent is in the diluent phase.

The crosslinking agent can be dissolved or dispersed in a diluent phase, preferably it is dispersed. The advantage of the crosslinking agent being dispersed in the diluent phase is that the viscosity of the composition can remain low.

The curable solvent and crosslinking agent are chosen so as to have complementary co-reactive groups which can react together in a crosslinking reaction. Examples of co-reactive groups are amine groups and epoxide groups, carboxyl groups and epoxide groups, hydroxyl groups and isocyanate groups, amine groups and isocyanate groups and hydroxyl groups and alkoxymethylated nitrogen groups such as those found in melamine formaldehyde, urea formaldehyde and phenol formaldehyde resins.

Examples of types of curable solvent which react with suitable crosslinking agents are epoxy resins, acrylic resins, phenolic resins and polyester resins. Preferably the curable solvent is an epoxy resin.

One suitable class of epoxy resins are those prepared by reacting an epihalohydrin, such as epichlorohydrin with a dihydroxy phenolic compound such as bis(4 hydroxy phenyl) methane (bis phenol F) or 2,2-bis (4 hydroxy phenol) propane (bis phenol A). Many such epoxy resins are commercially available in a range of epoxy equivalent weights, particularly as Epikote resins from Shell Chemicals Limited. These epoxy resins have the general formula:

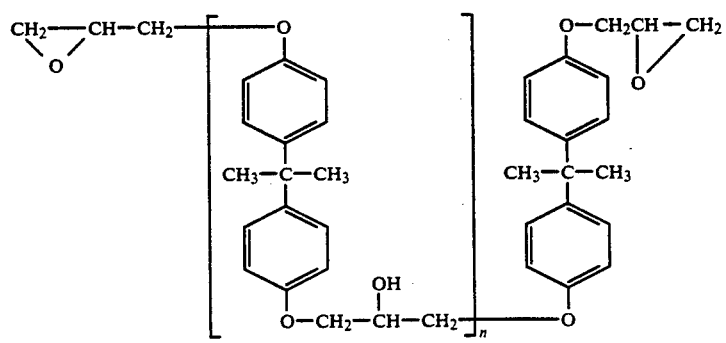

where n is preferably from 0 to 9 and may be non-integral, e.g. 1.2.

The epoxy resin can be an extended epoxy resin which comprises the reaction product of a standard epoxy resin, such as one of those described above, with a chain extender. Suitable chain extenders include diols for example diphenylol methane and diphenylol propane.

Other useful epoxy resins include glycidyl derivatives of terephthalic acid, isocyanurates, sorbitol and novolac resins which are polyphenol formaldehyde.

One commercially available polyester resin is Vesturit BL952 from Hüls chemicals.

One suitable type of polyester resin is a condensate of a mixture of terephthalic acid, isophthalic acid, adipic, trimethylol propane and neopentyl glycol.

When the curable solvent has hydroxyl groups or epoxide groups, examples of types of crosslinking agent which will react with the curable solvent are melamine formaldehydes, phenol formaldehydes, urea formaldehydes, diamines such as 1,6-hexamethylene diamine or triethylene tetramine and diacids such as oxalic, malonic or hexanedioic acid or anhydrides such as maleic anhydride or phthalic anhydride. Preferably the curing agent is a melamine formaldehyde resin. Many melamine formaldehyde resins are commercially available, for example from Dyno Cyanamid under the Trade Mark 'Cymel'.

The composition can also contain a catalyst for the curing of the solvent. The catalyst can either catalyse the self-crosslinking reaction of the curable solvent or the reaction of the curable solvent with the crosslinker.

The catalyst can be present in the polymer phase or can be dissolved or dispersed in the diluent phase. When the curable solvent can undergo a self crosslinking reaction the catalyst is preferably in the diluent phase. This reduces the risk of premature crosslinking of the curable solvent during the preparation of the composition.

Examples of suitable catalysts are acids, such as dinonyl naphthalene disulphonic acid.

Catalysts are generally used in an amount of up to about 1% by weight on polymer solids.

In addition to undergoing a crosslinking reaction, the curable solvent must also be capable of forming a solution with the crystallisable polymer. By "forming a solution" is meant that there is a temperature at or above ambient temperature above which the mixture of the curable solvent and the crystallisable polymer when pure will form a homogeneous single phase liquid solution which is clear to the unaided eye. Ambient temperature is generally between 10° and 25° C.

The curable solvent is at least partially reacted with the crystallisable polymer. By 'at least partially reacted' is meant that at least 0.5% preferably at least 1.0% by weight of the curable solvent is covalently bonded to the crystallisable polymer. The curable solvent can be covalently bonded to the polymer by co-reaction of reactive groups on the solvent with the crystallisable polymer. For example polyesters can have hydroxyl or carboxyl groups, and polyamides can have carboxyl groups or amine groups.

The reactive groups can be reacted with co-reactive groups on the curable solvent. For example if the curable solvent has epoxy groups and the polymer has carboxyl groups then these can be co-reacted by heating. Alternatively the reactive groups on the curable solvent can react with the polymer backbone for example if the crystallisable polymer is a polyester, by alcoholysis.

This co-reaction between the crystallisable polymer and the curable solvent generally takes place to a lesser extent than the crosslinking of the curable solvent. However, the co-reaction is necessary in that this creates covalent links between the curable solvent and the crystallisable polymer. It is believed that this covalent linking in combination with the miscibility of the curable solvent with the diluent combine to allow the reacted portion of the curable solvent to act as a stabiliser for the dispersed polymer phase. This stabiliser is formed by the reaction of the polymer and the curable solvent acts so as to retard or prevent the settling out of crystallisable polymer from the composition. This allows the dispersions to be made without added stabiliser.

Preferably the curable solvent has a molecular weight of greater than 300 to 1500 more preferably greater than 2000. These higher molecular weight solvents provide a more effective stabilisation for the dispersions. Mixtures of high and low molecular weight curable solvents can be used. In this case preferably at least 5% by weight of the curable solvent has a molecular weight of greater than 1500.

Preferably the curable solvent, crystallisable polymer and any auxiliary solvent are chosen such that they will only form a homogeneous solution when mixed together on heating them above ambient temperature for example 40°, preferably 100°, and most preferably 180° C. above ambient temperature.

The composition can also optionally comprise an auxiliary solvent. An auxiliary solvent is a material which is compatible with the curable solvent and a mixture of which together with the curable solvent can form a solution with the crystallisable polymer. An advantage of having an auxiliary solvent is that it facilitates dissolution of the polymer in the curable solvent. A second advantage is that the viscosity of the solution is reduced, which means that the process of making the dispersion is easier to carry out.

Generally, the amount of auxiliary solvent is no more than 60% of the combined weights of the crystallisable polymer and the curable solvent, and auxiliary solvent, preferably no more than 40%. Examples of suitable auxiliary solvents are dimethyl phthalate and propylene carbonate.

The polymer phase can also comprise a non-crystallisable polymer, for example a rubber. Preferably the polymer phase comprises less than 80% by weight of non-crystallisable polymer, more preferably less than 50% and most preferably less than 10%.

The continuous diluent can comprise any non-aqueous liquid which is miscible with the curable solvent but which does not dissolve the crystallisable polymer. By 'does not dissolve' is meant that the crystalline polymer will dissolve to an extent of 1% or less, preferably 0.1% or less, in the diluent at ambient temperatures. Preferably the diluent does not readily react with any of the components of the composition. Examples of suitable diluents are ester containing solvents such as butyl diglycol acetate and 1 methoxy-2-propanol acetate, or aromatic solvents such as $C_{8-11}$ aromatic hydrocarbons. A preferred diluent is butyl diglycol acetate.

The compositions of the invention are useful as coating compositions and can also comprise other conventional coating components such as pigments, extenders, cosolvents and surfactants.

The compositions can be made by a process which comprises forming a substantially homogeneous liquid solution of the crystallisable polymer in the curable solvent and subsequently emulsifying this liquid solution in the continuous diluent phase.

According to the present invention there is provided a process for making a curable composition, comprising a dispersion of a crystallisable polymer in a non-aqueous continuous diluent phase, in which the polymer is selected from polyesters, polyamides and polycarbonates, and the composition also comprises a curable solvent for the crystallisable polymer which is miscible with the continuous diluent and which is at least partially reacted with the crystallisable polymer, the composition also optionally comprising an auxiliary solvent, the process comprising the steps of;

(i) forming a homogeneous liquid solution of the crystallisable polymer in the curable solvent optionally together with any auxiliary solvent, (ii) heating the solution so as to cause at least partial reaction between the crystallisable polymer and the curable solvent, (iii) forming an emulsion by emulsifying the solution in a non-aqueous continuous diluent, the diluent being chosen so as to be immiscible with the crystallisable polymer at the temperature at which the emulsification is carried out, but miscible with the curable solvent and, where the emulsion is formed at a temperature above ambient temperature, (iv) allowing the emulsion to cool to ambient temperature.

A homogeneous solution is one which is substantially clear to the unaided eye. The homogeneous liquid solution of the crystallisable polymer in the curable solvent can be made by mixing the pure solvent and the solvent and any auxilliary solvent together and if necessary raising the temperature. Generally the mixture is physically agitated, for example stirred, to speed the dissolution process.

When the curable solvent comprises an extended epoxy resin, the composition can conveniently be made by first dissolving the crystallisable polymer in a mixture of a standard epoxy resin and a chain extender and subsequently forming the solution. The solution is held at to a reaction temperature at which the epoxy resin and the chain extender can react together in the presence of a suitable catalyst so as to form the extended epoxy resin. A suitable catalyst for the reaction is then added, and the solution is held at the reaction temperature, for example for 0.25 to 2 hours.

The solution is heated so as to cause partial reaction between the polymer and the solvent. For example when the solvent has epoxy or hydroxy functionality and the polymer is a polyester or a polycarbonate then the reaction can be carried out by heating to 220° C. for 15 minutes.

Generally, the greater the degree of reaction between the curable solvent and the crystallisable polymer then the easier the formation of the emulsion is in step (iii), and also the finer and more stable the resulting dispersion. However, complete reaction should be avoided as this can lead to gels rather than dispersions.

One modification of the process is that part of the reaction desired between the solvent and the crystallisable polymer can be carried out during the emulsification step (iii). That is, providing that enough reaction has taken place in the solution to enable an initial emulsion to be formed then further reaction can take place if the emulsion is held at an appropriate temperature under agitation. In this case the stability and fineness of the emulsion improves as the emulsion is heated and the reaction progresses.

The emulsification step (iii) can be carried out using conventional emulsifying apparatus such as a high speed stirrer or ultrasonic disperser. One particularly convenient high speed stirrer is a Silverson high speed stirrer available from Silverson Ltd.

The emulsification can be carried out by first adding the solution to the diluent and then applying shear using the emulsifying apparatus. Alternatively, shear may be applied initially to either the solution or the continuous diluent and the other component slowly added.

When the crystallisable polymer and curable solvent can form a homogeneous solution at ambient temperatures then the emulsion step (iii) can be carried out at ambient temperature.

Generally, if the emulsion is allowed to cool slowly then recrystallisation of the crystallisable polymer will occur and the resulting composition comprises a dispersion in which the polymer phase contains recrystallised polymer. Slowly means at a rate no faster than 20° C. per minute, preferably no faster than example 1° C. per minute.

Any crosslinking agent is added after the emulsification step (iii). Preferably it is added so as to form a dispersion in the diluent.

The size of the droplets or particles of the polymer phase depends on the viscosity of the solution at the temperature at which the emulsion step is carried out, the degree of agitation and the degree of reaction between the polymer and curable solvent. A lower solution viscosity, a greater degree of agitation, or a larger degree of reaction will generally give rise to smaller particles.

When the polymer phase is solid the particles of polymer phase can be separated from the continuous diluent as free flowing powders in a modification of the above process.

The modified process comprises the further steps of;
(v) isolating the solid polymer phase particles from the composition produced in step (iv), and
(vi) allowing the isolated particles to dry so as to remove the diluent,
whereby a powder comprising particles of polymer is obtained which contain entrapped curable solvent.

Optionally the isolated particles can be rinsed with a liquid which is not a solvent for the particles, in order to remove any unwanted residues of the continuous phase.

The particles can be isolated by filtering or by centrifuging. Filtering can be carried out by passing the emulsion through a filter medium for example filter paper or sintered glass.

Preferably the particles of polymer phase have a size of from 1–50μ when it desired to isolate them by the modified process. Particles in this size range are easy to isolate and are of a size suitable for use in coatings application.

According to a further aspect of the present invention there is provided a powder of crystallisable polymer particles which contain an entrapped curable solvent isolated according to the above modified process.

A crosslinking agent in solid powder form can be blended with the powder of crystallisable polymer particles.

These polymer particles can be redispersed in a liquid carrier so as to form a redispersed particle composition which is a liquid composition containing the redispersed particles. According to a further aspect of the present invention there is provided a redispersed particle composition which comprises particles as described above redispersed in a liquid carrier.

The composition according to the invention, the polymer particles of the invention, or the redispersed particle composition of the invention can be used in a coating process.

According to a further aspect of the present invention there is provided a process for forming a cured coating on the surface of a substrate which comprises the steps of;
i) applying a layer of a composition as described above or a powder of polymer particles as described above or a redispersed particle composition as described above to the surface of the substrate, and
ii) heating the applied layer to a temperature at least high enough to cause the solvent to cure.

Preferably the crystallisable polymer is chosen so that it redissolves in the curable solvent at the temperature at which the compositions is cured, after evaporation of any diluent.

The compositions or particles can be applied to the substrate by conventional application means. Examples of conventional application means for liquid compositions are brushing, spraying, dipping or roller-coating. An example of a conventional application means for powder is electrostatic spray.

Typically the applied layer is heated to between 50° and 300° C. most typically between 90° and 200° C. Typically the layer is heated for between 15s and 15 minutes so as to cause the solvent to cure.

The surfaces coated according to this invention can be metallic for example aluminium, stainless steel or non-metallic, for example glass, wood, paper or textile. The composition can be used to impregnate continuous rovings of a wide variety of fibres including glass and carbon fibres by application to the surface of the fibres. The impregnated fibres, can be shaped during curing to produce a composite which on cooling comprises fibre consolidated in cured solvent.

In particular the composition or powder can be used to coat sheets (especially sheets which are to be used in shaping processes), and shaped articles It is particularly useful for coating metal sheets such as those used to make cans for example food or beverage cans.

The invention also provides a substrate when coated by the above process.

The invention will be illustrated by the following examples:

EXAMPLES

Composition 1

A 50/50 blend of Epikote 1001 (a bisphenol A/epichlorohydrin type epoxy polymer of epoxide equivalent weight 450-500 available from Shell Chemicals) and a homopolymer of butylene terephthalate (available from Atochem under the Trade Mark Orgater TNMO) were melt blended in an extruder. The extruder was a Werner Pfleiferer ZSK 30 twin screw machine operated with a screw speed of 100 rpm and the barrel of the extruder was heated to 240° C. The extruded blend was cooled in an aluminium collecting tray. A sample of the resulting solid blend (10 g) was heated in a beaker to 230° C. in order to cause it to melt and then allowed to cool to 200° C. A 50/50 mixture of 1-methoxy-2 propanol acetate (10 g) and Solvesso 150 (a $C_{9-10}$ aromatic hydrocarbon available from Exxon Chemicals, 10 g) was added and the mixture was stirred by hand with a glass rod so as to obtain a dispersion. The temperature was allowed to fall to 120° C. and the mixture was then heated to 150° C. for 15 minutes and then allowed to cool to ambient temperature. The resulting dispersion had a non-volatile content of 33% and a particle size of 0.5 to 50μ.

Composition 2

Epikote 880 (a bisphenol A/epichlorohydrin type epoxy polymer of epoxide equivalent weight 182-194 available from Shell Chemicals, 75 g) and a homopolymer of butylene terephthalate (75 g) were heated to 225° C. for 1 hour. The resulting mixture was poured into a mixture of 1-methoxy-2-propanol acetate (100 g) and Solvesso 150 (100 g) at a temperature of 125° C. with stirring. The mixture was allowed to cool to room temperature resulting dispersion was a soft paste of 42.8% non-volatile content. The particle size of the dispersion was between 0.5 and 20μ.

Composition 3

A 50/50 blend of Epikote 1004 (a bisphenol A/epichlorohydrin type epoxy polymer of epoxide equivalent weight 850-940 available from Shell Chemicals) and a homopolymer of ethylene glycol and terephthalic acid with an intrinsic viscosity of 0.64 -0.66 $cm^3/g$ in orthochlorophenol at 25° C., were melt blended in an extruder as described in composition 1 except that the extruder barrel temperature was 270° C. A sample of the solidified resulting blend (30 g) was heated to 230° C. for 5 minutes. The blend was poured into a mixture of 1-methoxy-2-propanol acetate (60 g) and Solvesso 150 (60 g) at a temperature of 100° C. without stirring. The result was a friable solid mass. The mass was broken up using a Silverson high speed stirrer (Silverson is a Trade Mark). The resulting dispersion had a non-volatile content of 20% and a particle size range of 1-50μ.

Composition 4

Epikote 880 (12.5 g) and a homopolymer of butylene terephthalate (12.5 g) were heated to 230° C. for 40 minutes. This mixture was poured into 1-methoxy-2-propanol acetate (100 g) at 80° C. and was dispersed at 80° C. using a Silverson high speed stirrer. The resulting creamy dispersion had a non-volatile content of 25% and a particle size range of 2-50μ).

Composition 5

Epikote 1001 (200 g) and a copolymer of ethylene glycol and a mixture of terephthalic and isophthalic acids in an 82:18 ratio (200 g) with an intrinsic viscosity of 0.63-0.65 $cm^3/g$ in orthochlorophenol at 25° C. were heated to 205° C. for 1 hours. The mixture was poured into a mixture of Butoxy ethoxyethanol (100 g) and Solvesso 150 (100 g) at 90° C. The result was a soft paste which had a non-volatile content of 66% and a particle size range of 0.5 to 2μ.

Composition 6

Epikote 880 (50 g) and a copolymer of ethylene glycol and a mixture of terephthalic and isophthalic acids in an 82:18 ratio (50 g) was heated to 200° C. for 30 minutes. The mixture was poured into aromatic hydrocarbon Solvesso 200 (available from Exxon Chemicals)

(100 g) at 170° C. and was dispersed using a Silverson high speed stirrer at a temperature of 180° C. The mixture was cooled using an ice bath from 180° C. to 100° C. in 2 minutes. The resulting dispersion was a soft paste with a non-volatile content of 50% and a particle size range of 0.1 to 20μ.

Composition 7

Epikote 1004 (180 g), a homopolymer of butylene terephthalate (120 g) and triphenylethyl phosphonium iodide (0.3 g) were melt blended in an extruder as described in Composition 1. A sample of the solidified resulting mixture (30 g) and dimethylphthalate (10 g) were heated in a beaker to 260° C. and poured into butyl diglycol acetate (120 g) at 125° C. The mixture was dispersed using a Silverson high speed stirrer for 3 minutes during which time the temperature rose to 140° C. The mixture was cooled using an ice bath, reaching 49° C. within one minute. The resulting dispersion had a non-volatile content of 18.7% and a particle size range of 0.5 to 10μ.

Composition 8

This was prepared in exactly the same way as Composition 7 but the triphenylethyl phosphonium iodide was omitted. The resulting dispersion had a particle size range of (2 to 10μ).

Composition 9

This was prepared in exactly the same way as Composition 7 but using 60 g of the Epikote 1004/polybutylene terephthalate/triphenyl ethyl phosphonium iodide mixture and 20 g of dimethylphthalate. The resulting dispersion had a non-volatile content of 37% and a particle size range of 0.1–10μ.

Composition 10

This was prepared in exactly the same way as Composition 7 except that 75 g of Epikote 1004 and 225 g of butylene terephthalate polymer and 0.3 g of triphenylethyl phosphonium iodide were used to form the blend by the extrusion method. A sample of the solidified resulting mixture (30 g) was dispersed as described in Composition 7.

The resulting dispersion had a particle size range of 0.5 to 5μ.

Composition 11

This was prepared in exactly the same way as Composition 7 but using a mixture of Epikote 1004 (48 g) butylene terephthalate homopolymer (12 g) and of dimethylphthalate (20 g) were heated to 260° C. for 30 minutes in a beaker, and the polymer solution was added to butyl diglycol acetate at 120° C. The resulting dispersion had a particle size range of 0.5 to 5μ.

Composition 12

Epikote 1004 (30 g) and a copolymer of ethylene glycol and a mixture of terephthalic and isophthalic acids in an 82:18 ratio (20 g) were heated to 230° C. and allowed to cool to 180° C. Triphenylethyl phosphonium iodide (0.2 g) was added and the mixture was stirred for 2 minutes. The temperature was raised to 235° C. for 3 minutes and the mixture was then poured into butyl diglycol acetate (120 g) at 125° C. The mixture was dispersed using a Silverson high speed stirrer at half speed for 3 minutes and then the dispersion was cooled as described in Composition 7. The resulting dispersion had a non-volatile content of 29.4% and a particle size range of 0.5 –3μ.

Composition 13

A mixture of Epikote 1001 (30 g) and PETI (a copolymer of ethylene glycol and a mixture of terephthalic and isophthatic acids in 82:18 ratio; 30 g) was heated to 230° C. for 50 minutes and poured into xylene (120 g) at 120° C., with high speed stirring using a Silverson stirrer. After 3 minutes of further agitation the Silverson head was removed and the mixture was allowed to cool to room temperature. The resulting dispersion was a paste which consisted of particles whose size was 2–5μ.

Composition 14

This was made in the same way as composition 13 but diethylene glycol monohexyl ether instead of xylene was used. The resulting dispersion had the same characteristics as Composition 13.

Composition 15

A mixture of Epikote 880 (20 g) and a Crystallisable polyester polymer Kodar PETG copolyester 6763 (available from Eastman Kodak, 20 g) was heated to 215° C. for 20 minutes. The mixture was cooled to 160° C., and poured into butyl diglycol acetate (75 g) at 110° C. with high speed stirring using a Silverson high speed stirrer. After 3 further minutes of agitation the mixture was cooled using an ice bath. The temperature of the mixture decreased from 110° C. to 48° C. in 3 minutes. The resulting dispersion had a non-volatile content of 34% and consisted of clusters of particles whose primary size was 2–4μ.

Compositions 16A and 16B

Compositions 16A and 16B illustrate how the presence of a small quantity of a relatively high molecular weight curable resin influences the quality of the resulting product.

Composition 16A

Epikote 825 (almost pure diglycidyl ether of bisphenol A available from Shell Chemicals, 40 g) and a homopolymer of butylene terephthalate (40 g) were heated to 230° C. for 110 minutes and then poured into xylene (120 g) at 120° C. under high speed stirring using a Silverson high speed stirrer. After 3 minutes of agitation the Silverson was removed and the dispersion was allowed to cool to ambient temperature. The resultant dispersion was a very thick mobile paste containing particles in the 2–50μ region and had a non-volatile content of 46%.

Composition 16B

The procedure was as for composition 16A but the polymer blend consisted of Epikote 825 (40 g), Epikote 1001 (8 g) and polybutylene terephthalate (40 g). The resultant dispersion was a thick mobile paste containing particles in the 1–20μ region and had a non-volatile content of 42%.

Compositions 17A and 17B

Compositions 17A and 17B illustrate how the presence of a pre-formed polyester-epoxy adduct influences the final quality of the resulting product.

Composition 17A

Epikote 825 (18 g) and PETI (a copolymer of ethylene glycol and a mixture of terephthalic and isopthalic acids in a 82:18 ratio; 18 g) were heated to 230° C. for 30 minutes and poured into butyl diglycol acetate (120 g) at 130° C. under high speed stirring using a Silverson High Speed Stirrer. After 3 further minutes of stirring the mixture was cooled using an ice bath. The final dispersion had a non-volatile content of 19% and consisted of particles from submicron to 100 microns in size.

Composition 17B

The procedure was as for composition 17A but the polymer blend consisted of Epikote 825 (18 g), PETI (18 g) and Epikote 1007/PETI adduct (10 g). The Epikote 1007/PETI adduct was prepared by extruding a 1:1 blend of Epikote 1007 (a bisphenol A/epichlorohydrin type epoxy polymer of epoxide equivalent weight 1700–2050 available from Shell Chemicals) and the copolymer PETI. The extruder was a Werner Pfleiferer ZSK 30 twin screw machine operated with a screw speed of 100rpm and a barrel temperature of 235° C. For composition 17B the final dispersion had a non-volatile content of 22% and consisted of particles from submicron to 50μ in size with more particles in the fine end range than composition 17A.

Composition 18A–18E

These compositions show the importance of the presence of a curable resin in the preparation, and the influence of polymer blend make-up and of the degree of reaction between the curable resin and the polymer upon the quality of the resulting product. The compositions are summarised in Tables 1 and 2.

TABLE 1

| Composition | Polymer Blend | | | Hold Temp (°C.)/ Hold Time (Mins) |
| --- | --- | --- | --- | --- |
|  | Epikote 1004 (g) | PBT (g) | DMP (g) |  |
| 18A | — | 30 | 20 | 260° C./15 |
| 18B | — | 20 | 20 | 250° C./20 |
| 18C | 3 | 18 | 12 | 230° C./20 |
| 18D | 3 | 18 | 12 | 230° C./45 |
| 18E | 3 | 18 | 6 | 230° C./20 |
| 10 | 7.5 | 22.5 | 10 | 260° C./10 |

TABLE 2

| Comp | Solids % non-vol | Particle Size and Comments |
| --- | --- | --- |
| 18A | 14 | No dispersion/Fibrous mass |
| 18B | 18 | No dispersion/Stringy mass |
| 18C | 12 | 4–50μ + some fibers |
| 18D | 5 | 4–50μ, No fibers. |
| 18E | 8 | 1–1000μ. |
| 10 | 17 | 0.5–5μ. |

Compositions 18A–18E were prepared by taking the quantities of the polymer blends given above and heating them to the specified temperature for the given time. The melt was then poured into butyl diglycol acetate (120 g) at 120° C. with agitation provided by a Silverson high speed disperser. After 3 minutes of agitation the dispersion was cooled by an ice bath.

Composition 10 is shown in Tables 1 and 2 for comparison. It is clear that curable solvent, in this case Epikote 1004 is necessary for the formation of good dispersions.

Coating Compositions

Compositions as described above were made into Coating Compositions by the addition of crosslinker, solvent, and in some cases a catalyst. The Coating Compositions are given in Table 3 below.

TABLE 3

| Coating Comp. | Comp. (as Above) | Crosslinking Agent | Addit. Solvent | Catalyst |
| --- | --- | --- | --- | --- |
| 1 | 1(30 g) | A(1 g) | MEK(35 g) | C(0.1 g) |
| 2 | 2(20 g) | A(0.86 g) | MEK(20 g) | none |
| 3 | 3(20 g) | A(0.2 g) | none | none |
| 4 | 10 | none | none | none |
| 5 | 10(30 g) | A(0.32 g) | none | D(0.2 g) |
| 6 | 15(15 g) | A(0.51 g) | MEK(15 g) | D(0.3 g) |
| 7 | 16A(30 g) | A(1.4 g) | MEK(15 g) | D(1 g) |
| 8 | 16B(30 g) | A(1.26 g) | MEK(15 g) | D(1 g) |
| 9 | 17A(30 g) | B(1.4 g) | none | none |
| 10 | 17B(30 g) | B(1.4 g) | none | none |

The crosslinking agents were dispersed in the compositions by means of a Silverson high speed stirrer.
In Table 3;
MEK is methyl ethyl ketone.
Crosslinking Agent A is a melamine formaldehyde available as Cymel 303 from Dyno Cynamid.
Crosslinking agent B is 3,3-diamino diphenyl sulphone available from Aldrich Chemicals.
Catalyst C is Nacure X49-110 a sulphonic acid catalyst available from King Industries.
Catalyst D is a solution of Nacure 5225 (also from King Industries; 2 g) in butanol (98 g).

APPLYING THE COMPOSITIONS AS COATINGS

The coating compositions were applied by means of a No. 6 'K-bar° available from RK Print-Coat Instruments Ltd., Royston, Herts (U.K.) onto clean aluminium panels of dimensions 30 mm × 100 mm × 0.9 mm.

The resulting coated aluminum panels were subjected to a curing step which comprised heating the panel in an oven and with the oven at such a temperature as to cause the temperature of the metal to reach the required peak metal temperature (PMT) at the end of the heating step. The metal temperature is measured using a thermocouple which is held in contact with the reverse uncoated side of the metal panel by means of heat resistant tape. The temperature of the oven is adjusted so as to give the required PMT by trial and error using an uncoated aluminium panel. Certain of the panels were quenched after curing which comprised dipping the coated panel into a waterbath at ambient temperature immediately after removal from the oven.

A summary of the panels is given in Table 4.

TABLE 4

| Panel | Coating Comp. | PMT (°C.) | Time (min) | Film Thickness (μ) | Quenched |
| --- | --- | --- | --- | --- | --- |
| 1 | 1 | 225 | 10 | 9 | yes |
| 2 | 2 | 225 | 10 | 10 | yes |
| 3 | 3 | 255 | 10 | 14 | yes |
| 4 | 4 | 240 | 10 | 12 | No |
| 4A | 4 | 240 | 10 | 12 | Yes |
| 5 | 5 | 240 | 10 | 13 | No |
| 5A | 5 | 240 | 10 | 12 | Yes |
| 6 | 6 | 228 | 10 | 7 | No |
| 6A | 6 | 228 | 10 | 8 | Yes |

TABLE 4-continued

| Panel | Coating Comp. | PMT (°C.) | Time (min) | Film Thickness (μ) | Quenched |
|---|---|---|---|---|---|
| 7 | 7 | 228 | 10 | 8 | No |
| 7A | 7 | 228 | 10 | 6 | Yes |
| 8 | 8 | 228 | 10 | 8 | No |
| 8A | 8 | 228 | 10 | 10 | Yes |
| 9 | 9 | 220 | 20 | 17 | No |
| 9A | 9 | 220 | 20 | 17 | Yes |
| 10 | 10 | 220 | 20 | 15 | No |
| 10A | 10 | 220 | 20 | 15 | Yes |

TESTING THE COMPOSITIONS

The coatings were subjected to a number of tests. These were the T-bend test, Reverse Impact Test, Box forming test, acid and water boil tests and Chisel Test.

The tests are described below and the results given in Table 5.

T-BEND TEST

This test is carried out at 20° C.

A piece of cured, coated plate is bent through 180° with the coated surface on the outside of the bend, so that a flat bend is produced. The coating is then assessed for adhesion on the bent edge firstly by visual examination, then by scratching with the finger nail. The results are graded as below and the mean of several assessments taken for any coating. The above bend is termed an 0T (zero T) bend. A 1T bend is carried out by bending the test panel through 180° over one thickness of plate of the same gauge as the test panel. A 2T bend is carried out by bending the test panel through 180° over two pieces of plate of the same gauge as the test panel. A 3T bend uses three pieces of plate, and so on.

Grade 1: No cracking or loss of adhesion at bend.
Grade 2: Slight cracking at bend. Coating can be scratched off with finger nail with difficulty.
Grade 3: Moderate cracking at bend. Coating can be scratched off quite easily with fingernail.
Grade 4: Extensive cracking at bend. Coating may be rubbed off with ball of thumb.
Grade 5: Very severe cracking at bend. Coating becomes detached whilst the bend is being formed.

REVERSE IMPACT TEST

The Reverse Impact Test is performed according to the procedure of ASTM Test D 4145 -83 ("Resistance of Organic Coatings to the Effects of Rapid Deformation") the contents of which are herein incorporated by reference.

CHISEL TEST

In the Chisel Test, the apex of an isoceles triangular blade was stood on the coating with the blade touching the coating and subtending an angle of 45° C. thereto. The base of the triangle was 6.1 mm long and the distance from the base to the apex was also 6.1 mm. The chisel was loaded with a weight and then drawn once across the coating in a direction parallel to the 300 mm edge of the aluminium panel. The loading weight was increased until the apex of the blade caused the aluminium surface to become visible through the coating when viewed through an optical microscope at ten fold magnification. The loading needed for this to happen is recorded.

BOX FORMING TEST

The Asymmetric box is a rectangular tool 75 mm×60 mm×25 mm deep. Each of the four corners has a different radius. The tool is designed to assess the drawing properties, adhesion and flexibility of coatings and lacquers. The coated, stoved plate is stamped into Asymmetric boxes with tooling lubricant, and with the coating inside and outside. The stamp used in a Hordern Mason and Edwards Ltd (Birmingham) stamp model MHE OP30.

Excess lubricant is wiped off with a clean soft cloth and the stamping examined visually for film continuity, cracking, loss of gloss etc. and the adhesion of the coating tested by scraping with the finger nail.

The results are graded numerically as below, taking the mean value for several stampings, quoting values of corners of decreasing radii.

| Grade | Description |
|---|---|
| 1. | No cracking on the shoulder; no loss of gloss or adhesion on the drawn portion, particularly at the corner of smallest radius. |
| 2. | Slight breakdown in one or more of the above properties but no breakdown at the corner of next to smallest radius. |
| 3. | Moderate breakdown in one or more of the above properties but no breakdown at the corner of next to largest radius. |
| 4. | Severe breakdown in one or more of the above properties but no breakdown at the corner of largest radius. |
| 5. | Complete breakdown in one or more of the above properties. |

WATER OR ACID BOIL TEST

A 5cm² section of coated aluminium panel is scored with sets of parallel lines in the same way as for the cross Hatch Test, below. The panel is then immersed in a boiling liquid which is either a 5% aqueous solution of acetic acid for the Acid Boil Test or alternatively in distilled water for the water boil test and is kept immersed in the boiling liquid for 30 minutes.

On removal the panel is rinsed and dried and then tested using grade 610 sticky tape and rated in the same way as for the Cross Hatch Test below.

The results of testing the compositions are given in table 5.

CROSS HATCH TEST

The test is carried out at 20° C. The cured, coated aluminium plate is scored in a number of parallel lines about 2 mm apart using a sharp, pointed instrument or blade, or an Elcometer 107 cross hatch adhesion tester. The score marks cut completely through the coating to the metal beneath. A second set of scored lines is then drawn 2 mm apart, across and at right angles to the first set.

A strip of transparent adhesive tape is pressed down onto the coated surface across the scored lines, ensuring that all air bubbles are excluded. Scotch Tape Grade 610 is used.

The tape is then snatched off and the result graded numerically as below, according to the quantity of coating removed with the tape.

Grade 1: No removal of coating.

Grade 2: Slight removal of coating (Up to 10% of taped area).
Grade 3: Moderate removal of coating (10%-30% of taped area).
Grade 4: Severe removal of coating (30%-60% of taped area).
Grade 5: Almost complete removal of coating. (60%-100% of taped area).

TABLE 5
RESULTS OF TESTING THE COMPOSITIONS

| Panel | Appearance | MEK Rubs | T-bend | Chisel Test(g) | Reverse Impact |
|---|---|---|---|---|---|
| 1 | 1 | >100 | 2T | 200 | >120 |
| 2 | 1,2 | 80 | 0T | 200 | >120 |
| 3 | 1,2 | >100 | 3T | 100 | 40 |
| 4 | 2,3 | 100 | 3T | 200 | 100 |
| 4A | 1,2 | 26 | 1T | 200 | 80 |
| 5 | 4,5 | >100 | 6T | 100 | 60 |
| 5A | 1,5 | >100 | 3T | 200 | 120 |
| 6 | 1,2 | >100 | 2T | 100 | >120 |
| 6A | 1,2 | >100 | 2T | 100 | >120 |
| 7 | 1,2,7 | >100 | 2T | 100 | >120 |
| 7A | 1,2,7 | >100 | 2T | 300 | >120 |
| 8 | 1,2 | >100 | 2T | 100 | >120 |
| 8A | 1,2 | >100 | 2T | 200 | >120 |
| 9 | 6,8 | 80 | 3T | 100 | 60 |
| 9A | 6,8 | 80 | 2T | 100 | 60 |
| 10 | 6 | 80 | 3T | 100 | 60 |
| 10A | 6 | 60 | 2T | 100 | 60 |

Reverse impact results are given in inch-pounds.
In Table 5 the film appearance is rated as follows;
1 = Clear
2 = Glossy
3 = Hazy
4 = Opaque
5 = Matt
6 = Yellow/Brown
7 = Slightly bitty
8 = Bitty.

Panels 4, 4A, 6, 6A, 8 and 8A all rated 1,1,1,1 on the assymetric box test for both inside and outside tests.

Panels 4A, 6, 6A, 8 and 8A rated a 100% pass on the Water Boil Test while panel 4 rated an 85% pass.

Panels 4A, 8 and 8A rated a 100% pass on the Acid Boil Test, panel 4 rated a 20% pass, panel 6 rated a pass and panel 6A rated a 10% pass.

We claim:

1. A composition comprising a polymer phase in dispersion in a non-aqueous continuous diluent, in which the polymer phase comprises a crystallisable polyester, a curable solvent for the crystallisable polyester which is miscible with the continuous diluent, and, optionally, an auxiliary solvent, and in which the curable solvent is reacted with the crystallisable polyester, so as to form a stabiliser for the dispersion.

2. A composition according to claim 1 in which the weight ratio of the curable solvent to the crystallisable polymer in the composition is from 5:85 to 85:15.

3. A composition according to claim 1 in which the polymer phase comprises at least 5% by weight of the composition.

4. A composition according to claim 1 in which the curable solvent is chosen such that phase separation of crystalline polymer can occur on curing the solvent.

5. A composition according to claim 1 in which the curable solvent is a material which reacts with a crosslinking agent and the composition also comprises a crosslinking agent for the curable solvent.

6. A composition according to claim 5 in which the crosslinking agent is dispersed in the diluent.

7. A composition according to claim 1 in which curable solvent is an epoxy resin.

8. A composition according to claim 1 which at ambient temperature comprises solid particles of the polymer phase dispersed in the diluent.

9. A composition according to claim 8 in which the particle size is between 0.1 and 500μ.

* * * * *